Figure 1:
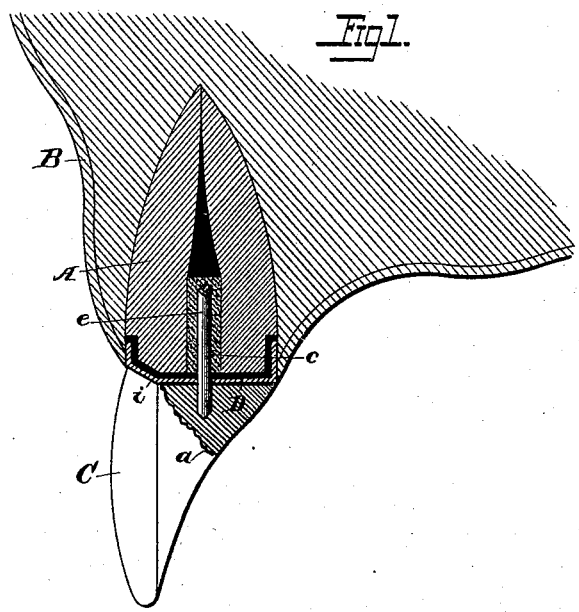

(No Model.)

L. T. SHEFFIELD.
ARTIFICIAL TOOTH.

No. 352,785. Patented Nov. 16, 1886.

Attests:
John G. Hinkel Jr.
Wm. F. Sayers.

Lucius T. Sheffield
Inventor:
By Foster & Freeman
attys.

UNITED STATES PATENT OFFICE.

LUCIUS T. SHEFFIELD, OF NEW YORK, N. Y.

ARTIFICIAL TOOTH.

SPECIFICATION forming part of Letters Patent No. 352,785, dated November 16, 1886.

Application filed April 24, 1885. Serial No. 163,326. (No model.)

*To all whom it may concern:*

Be it known that I, LUCIUS T. SHEFFIELD, a citizen of the United States, residing in the city, county, and State of New York, have invented certain new and useful Improvements in Artificial Teeth, of which the following is a specification.

In connecting artificial tooth-crowns to the natural roots of teeth it has been common heretofore to employ a cement, which is interposed between the cap of the artificial crown and the end of the root, so as to fill all the interstices and prevent the access of fluids of the mouth to the end of the root, and also aid in securing the artificial denture to its support.

The cement heretofore used has generally been a crystallizing cement, composed of anhydrous oxide of zinc in the form of a powder and a solution of glacial phosphoric acid. The use of this material has proved objectionable for several reasons. First, the cement, which is forced out from the cap in applying the same to the root, is brought in contact with the gum and periosteum, and frequently causes intense pain to the patient; second, in the mouths of some patients the aforesaid cement dissolves very readily and the crown becomes loose; third, the said cement will set very quickly, and will sometimes set before the denture can be properly put in place, especially when the denture is large, causing pain to the patient and interfering greatly with the adjustment of the denture. In those cases where several crowns are connected by bridges, and one or more of them becomes loosened from any of the causes above set forth, the play of the denture causes great pain. To obviate these objections I make use of an insoluble cement of any suitable material, (as, for instance, gutta-percha dissolved in chloroform,) which cement should be of such a character as to exclude the air and moisture and not be affected by any of the fluids of the mouth and to harden gradually. In using this cement it is placed in the caps or hollow crown-covers, as usual, and the denture is then adjusted to its position, the cement being thereby pressed into all the cavities and any surplus being forced over the edges of the caps, from which it can be readily removed while it is in a soft state. As the solvent evaporates the gum will gradually harden, and the denture will become firmly seated in its place, air and fluids will be excluded, and the fluids of the mouth will have no influence to loosen the fastening. Another desirable feature of this cement is its innoxious character, as it can be applied to the gums even when in a highly inflamed condition without causing the slightest pain.

While the gutta-percha cement alone will serve as a means of securing the denture when the latter has more than one bearing, it does not in all cases afford when first used sufficient support to hold a single denture in its place. In such case I apply a portion of the before-described crystallizing cement to the prepared root-canal by means of a suitable instrument and then insert a portion of the gutta-percha cement in the cap and adjust the denture to its place, so that when the usual pin or pivot enters the canal in the root the crystallizing cement will fill the said cavity and inclose the pin and hold the same with the tooth-crown firmly in its place, while the gutta-percha cement will effectually prevent the entrance of moisture and preserve the crystallized cement from the action of the fluids of the mouth, so that the attachment will remain firm under all circumstances. Inasmuch as the gutta-percha hardens but slowly, its use does not interfere with the perfect adjustment of the denture to its place.

Figure 2:
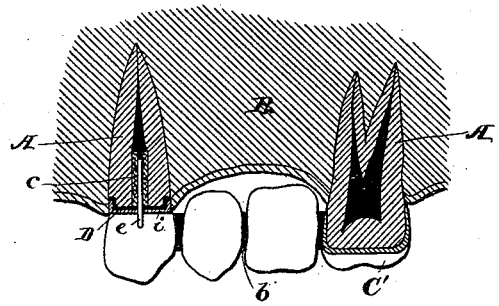

The drawings illustrate in Figure 1, in part section, the application of a single artificial denture to the mouth in accordance with my invention, and in Fig. 2 a like application of a partial set of teeth.

In Fig. 1, A is the prepared root. B is the gum. C is the artificial tooth-crown secured to a metallic backing, *a*. D is the metallic cup secured to the backing *a*. *e* is a pin extending from the said backing. The crystallizing cement is represented in section at *c*, and the rubber cement by the solid line at *i*. C' represents a metallic covering-crown, and *b* represents in Fig. 2 a bridge connecting the two crowns C C'.

By the above-described improvement the following advantages are gained: First, when the crystallizing cement is used, it cannot pain the patient by being forced out of the cap upon the gums; secondly, the fluids of the mouth have no effect upon the fastening; thirdly, the cement hardens so slowly as to afford ample time for the adjustment of the denture, but finally becomes sufficiently hard to support the denture firmly in the mouth.

While I have referred to the use of a gutta-percha cement, I do not limit myself to one made of this material, as any cement which will harden slowly and is water-proof and will prevent the access of moisture to the root and which will not be acted upon by the fluids of the mouth may be employed—for instance, a rubber cement.

Without limiting myself to the use of a water-proof cement of any special material, I claim as my invention—

1. The combination, with a prepared root or roots and with an artificial denture adapted and applied to said root or roots, of an interposed water-proof cement, substantially as set forth.

2. The combination of the prepared root or roots, artificial denture adapted thereto, a crystallizing cement applied directly to the roots, and a water-proof cement interposed between the crystallized cement and the denture, substantially as described.

3. The combination, with a prepared root or roots and an artificial denture adapted to be supported thereby, of an interposed cement consisting of a solution of gutta-percha, substantially as set forth.

4. The combination, in an artificial denture, and with the natural root or roots supporting the same, of the tooth-crowns provided with caps adapted to the roots and with pins adapted to openings in the roots, and an interposed gutta-percha cement, substantially as described.

In testimony whereof I have signed my name to this specification in the presence of two subscribing witnesses.

LUCIUS T. SHEFFIELD.

Witnesses:
JOS. M. JAFFRAY,
WILLIAM H. HODGINS,